United States Patent
Turner et al.

(10) Patent No.: US 10,558,913 B1
(45) Date of Patent: *Feb. 11, 2020

(54) MACHINE-LEARNING TECHNIQUES FOR MONOTONIC NEURAL NETWORKS

(71) Applicant: Equifax Inc., Atlanta, GA (US)

(72) Inventors: Matthew Turner, Cumming, GA (US); Lewis Jordan, Atlanta, GA (US); Allan Joshua, Atlanta, GA (US)

(73) Assignee: EQUIFAX INC., Atlanta, GA (US)

( * ) Notice: Subject to any disclaimer, the term of this patent is extended or adjusted under 35 U.S.C. 154(b) by 77 days.

This patent is subject to a terminal disclaimer.

(21) Appl. No.: 16/173,427

(22) Filed: Oct. 29, 2018

Related U.S. Application Data

(63) Continuation of application No. 16/169,963, filed on Oct. 24, 2018.

(51) Int. Cl.
*G06N 3/08* (2006.01)
*G06N 3/04* (2006.01)

(52) U.S. Cl.
CPC ............. *G06N 3/08* (2013.01); *G06N 3/0472* (2013.01); *G06N 3/0481* (2013.01)

(58) Field of Classification Search
CPC ....... G06N 3/08; G06N 3/0472; G06N 3/0481
(Continued)

(56) References Cited

U.S. PATENT DOCUMENTS 7,280,980 B1 10/2007 Hoadley et al.
10,133,980 B2 11/2018 Turner et al.
(Continued)

FOREIGN PATENT DOCUMENTS

EP 3274928 1/2018
WO 2016070096 5/2016
(Continued)

OTHER PUBLICATIONS

U.S. Appl. No. 15/560,401, "Corrected notice of Allowability", dated Sep. 5, 2018, 18 pages.
(Continued)

*Primary Examiner* — Dave Misir
(74) *Attorney, Agent, or Firm* — Kilpatrick Townsend & Stockton LLP

(57) ABSTRACT

In some aspects, a computing system can generate and optimize a neural network for risk assessment. The neural network can be trained to enforce a monotonic relationship between each of the input predictor variables and an output risk indicator. The training of the neural network can involve solving an optimization problem under a monotonic constraint. This constrained optimization problem can be converted to an unconstrained problem by introducing a Lagrangian expression and by introducing a term approximating the monotonic constraint. Additional regularization terms can also be introduced into the optimization problem. The optimized neural network can be used both for accurately determining risk indicators for target entities using predictor variables and determining explanation codes for the predictor variables. Further, the risk indicators can be utilized to control the access by a target entity to an interactive computing environment for accessing services provided by one or more institutions.

19 Claims, 5 Drawing Sheets

(58) Field of Classification Search
USPC .............................................. 705/15; 706/15
See application file for complete search history.

(56) References Cited

U.S. PATENT DOCUMENTS

| | | |
|---|---|---|
| 2004/0073096 A1* | 4/2004 | Kates ...................... G06N 3/02 600/300 |
| 2008/0301075 A1 | 12/2008 | Bolt et al. |
| 2012/0066163 A1 | 3/2012 | Balls et al. |
| 2012/0316981 A1 | 12/2012 | Hoover et al. |
| 2012/0317058 A1 | 12/2012 | Abhulimen |
| 2013/0332338 A1 | 12/2013 | Yan et al. |
| 2018/0025273 A1 | 1/2018 | Jordan et al. |
| 2018/0068219 A1 | 3/2018 | Turner et al. |
| 2018/0157661 A1 | 6/2018 | Zoldi et al. |

FOREIGN PATENT DOCUMENTS

| | | |
|---|---|---|
| WO | 2016160539 | 10/2016 |
| WO | 2019110980 A1 | 6/2019 |

OTHER PUBLICATIONS

U.S. Appl. No. 15/560,401, "Corrected Notice of Allowability", dated Sep. 11, 2018, 5 pages.
U.S. Appl. No. 15/560,401, "Notice of Allowance", dated Aug. 7, 2018, 22 pages.
Cybenko , "Approximation by Superpositions of a Sigmoidal Function Mathematics", Mathematics of Control,Signals, and Systems, vol. 2, 1989, pp. 303-314.
Hand et al., "Justifying Adverse Actions With New Scorecard Technologies", Journal of Financial Transformation, 2009, 5 pages.
Haykin , "Feedforward Neural Networks: An Introduction", 1998, 16 pages.
Hu et al., "An Integrative Framework for Intelligent Software Project Risk Planning", Decision Support Systems, vol. 55, Issue 4, Nov. 2013, pp. 927-937.
Mahul et al., "Training Feed-Forward Neural Networks with Monotonicity Requirements", Technical Report, Research Report RR-04-11, LIMOS/CNRS 6158, Jun. 2004, 14 pages.
PCT/US2016/024134 , "International Preliminary Report on Patentability", dated Oct. 12, 2017, 11 pages.
PCT/US2016/024134 , "International Search Report and Written Opinion", dated Jul. 12, 2016, 12 pages.
Rouhani-Kalleh , "Analysis, Theory and Design of Logistic Regression Classifiers Used for Very Large Scale Data Mining", 2006, 96 pages.
Rouhani-Kalleh , "Omid's Logistic Regression Tutorial", Available Online at: http://www.omidrouhani.com/research/logisticregression/html/logisticregression.html, 2006, 32 pages.
Shang et al., "Applying Fuzzy Logic to Risk Assessment and Decision-Making", Society of Actuaries, Available Online at: https://www.soa.org/Research/Research-Projects/Risk-Management/research-2013-fuzzyologic.aspx, Nov. 2013, 59 pages.
Archer , "Application of the Back Propagation Neural Network Algorithm with Monotonicity Constraints for Two-Group Classification Problems", Decision Sciences, vol. 24, No. 1, Jan. 1, 1993, pp. 60-75.
Daniels et al., "Monotone and Partially Monotone Neural Networks", IEEE Transactions on Neural Networks, vol. 21, No. 6, Jun. 1, 2010, pp. 906-917.
EP16773816.0 , "Extended European Search Report", dated Nov. 14, 2018, 7 pages.

* cited by examiner

MACHINE-LEARNING TECHNIQUES FOR MONOTONIC NEURAL NETWORKS

CROSS REFERENCE TO RELATED APPLICATIONS

This application is a continuation of U.S. application Ser. No. 16/169,963, entitled "Machine-Learning Techniques for Monotonic Neural Networks," filed on Oct. 24, 2018, which is hereby incorporated in its entirety by this reference.

TECHNICAL FIELD

The present disclosure relates generally to artificial intelligence. More specifically, but not by way of limitation, this disclosure relates to machine learning using artificial neural networks for emulating intelligence that are trained for assessing risks or performing other operations and for providing explainable outcomes associated with these outputs.

BACKGROUND

In machine learning, artificial neural networks can be used to perform one or more functions (e.g., acquiring, processing, analyzing, and understanding various inputs in order to produce an output that includes numerical or symbolic information). A neural network includes one or more algorithms and interconnected nodes that exchange data between one another. The nodes can have numeric weights that can be tuned based on experience, which makes the neural network adaptive and capable of learning. For example, the numeric weights can be used to train the neural network such that the neural network can perform the one or more functions on a set of input variables and produce an output that is associated with the set of input variables.

SUMMARY

Various embodiments of the present disclosure provide systems and methods for optimizing a monotonic neural network for risk assessment and outcome prediction. A monotonic neural network is trained to compute a risk indicator from predictor variables. The neural network model can be a memory structure comprising nodes connected via one or more layers. The training of the monotonic neural network involves accessing training vectors that have elements representing training predictor variables and training outputs. A particular training vector can include particular values for the corresponding predictor variables and a particular training output corresponding to the particular values of the predictor variables.

The training of the monotonic neural network further involves performing iterative adjustments of parameters of the neural network model to minimize a loss function of the neural network model subject to a path constraint. The path constraint requires a monotonic relationship between values of each predictor variable from the training vectors and the training outputs of the training vectors. The iterative adjustments can include adjusting the parameters of the neural network model so that a value of a modified loss function in a current iteration is smaller than the value of the modified loss function in another iteration. The modified loss function includes the loss function of the neural network and the path constraint.

In some aspects, the optimized monotonic neural network can be used to predict risk indicators. For example, a risk assessment query for a target entity can be received from a remote computing device. In response to the assessment query, an output risk indicator for the target entity can be computed by applying the neural network model to predictor variables associated with the target entity. A responsive message including the output risk indicator can be transmitted to the remote computing device.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

DETAILED DESCRIPTION

Figure 1:
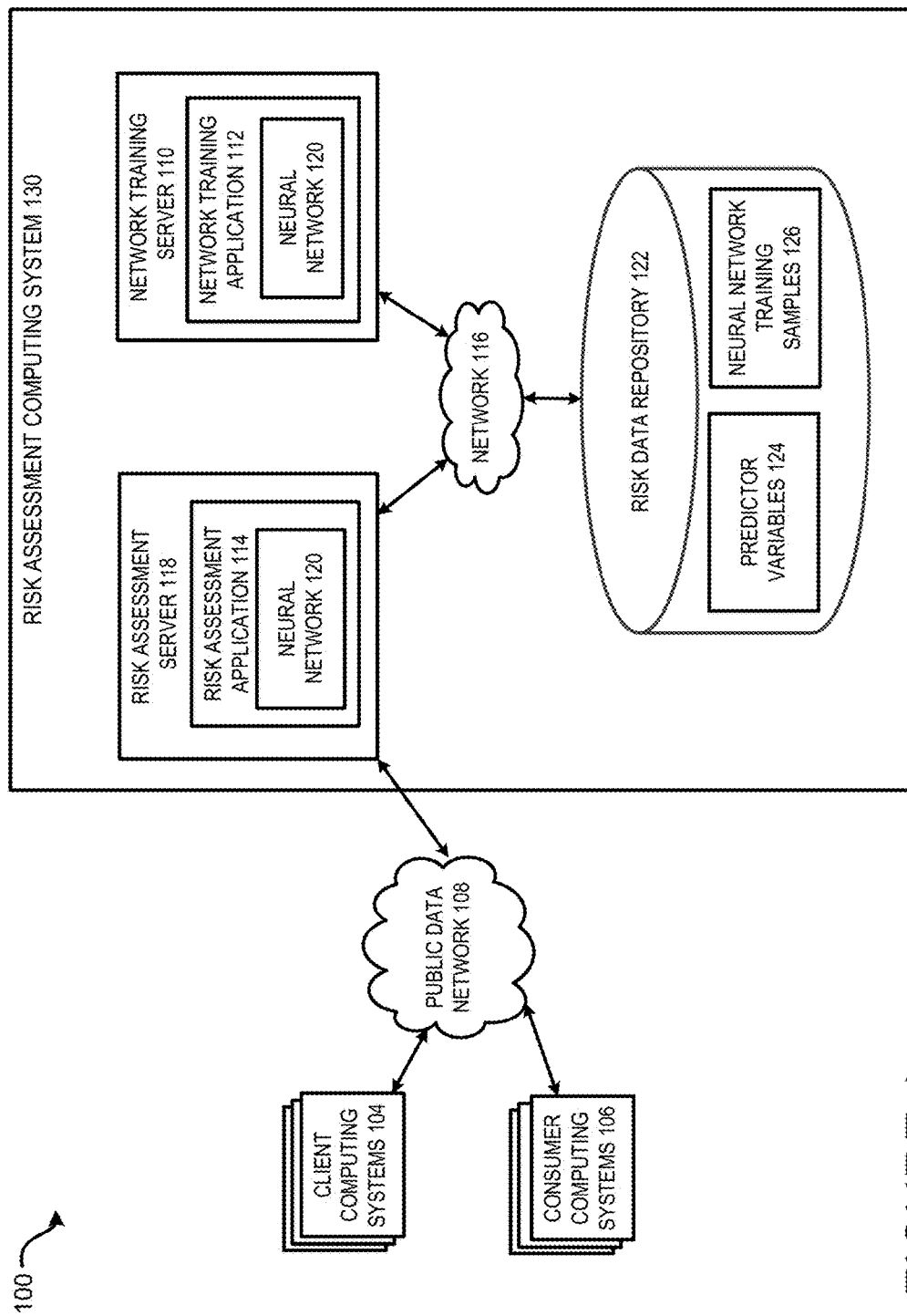
FIG. 1 is a block diagram depicting an example of a computing environment in which a monotonic neural network can be trained and applied in a risk assessment application according to certain aspects of the present disclosure.

Machine-learning techniques can involve inefficient expenditures or allocations of processing resources without providing desired performance or explanatory capability with respect to the applications of these machine-learning techniques. In one example, the complicated structure of a neural network and the interconnections among the various nodes in the neural network can increase the difficulty of explaining relationships between an input variable and an output of a neural network. Although monotonic neural networks can enforce monotonicity between input variables and an output and thereby facilitate formulating explainable relationships between the input variables and the output, training a monotonic neural network to provide this explanatory capability can be expensive with respect to, for example, processing resources, memory resources, network bandwidth, or other resources. This resource problem is especially prominent in cases where large training datasets are used for machine learning, which can result in a large number of the input variables, a large number of network layers and a large number of neural network nodes in each layer.

Certain aspects and features of the present disclosure that optimize a monotonic neural network for risk assessment or other outcome predictions can address one or more issues identified above. A monotonic neural network can maintain a monotonic relationship between an input variable and an outcome or other output, such as a positive change in the input variable resulting in a positive change in the output. Such a monotonic property is useful to evaluate the impact of an input variable on the output. For example, in risk assessment, the monotonic relationship between each predictor variable and the output risk indicator can be utilized to explain the outcome of the prediction and to provide explanation codes for the predictor variables. The explanation codes indicate an effect or an amount of impact that a given predictor variable has on the risk indicator.

To ensure monotonicity of a neural network, the training of the neural network can be formulated as solving a constrained optimization problem. The goal of the optimization problem is to identify a set of optimized weights for the neural network so that a loss function of the neural network is minimized under a constraint that the relationship between the input variables and an output is monotonic. To reduce the computational complexity of the optimization problem, thereby saving computational resources, such as CPU times and memory spaces, the constrained neural network can be approximated by an unconstrained optimization problem. The unconstrained optimization problem can be formulated by introducing a Lagrangian multiplier and by approximating the monotonicity constraint using a smooth differentiable function.

Some examples of these aspects can overcome one or more of the issues identified above. Certain aspects can include operations and data structures with respect to neural networks that improve how computing systems service analytical queries as well as recited in the claims that provided eligibility. For instance, the neural network presented herein is structured so that a monotonic relationship exists between each of the input and the output. Structuring such a monotonic neural network can include enforcing the neural network, such as through the weights of the connections between network nodes, to provide monotonic paths from each of the inputs to the outputs. Such a structure can improve the operations of the neural network by eliminating post-training adjustment of the neural network for monotonicity property, and allowing using the same neural network to predict an outcome and to generate explainable reasons for the predicted outcome. Additional or alternative aspects can implement or apply rules of a particular type that improve existing technological processes involving machine-learning techniques. For instance, to enforce the monotonicity of the neural network, a particular set of rules are employed in the training of the neural network. This particular set of rules allow the monotonicity to be introduced as a constraint in the optimization problem involved in the training of the neural network, which allows the training of the monotonic neural network to be performed more efficiently without any post-training adjustment. Furthermore, additional rules can be introduced in the training of the neural network to further increase the efficiency of the training, such as rules for regularizing overfitting of the neural network, rules for stabilizing the neural network, or rules for simplifying the structure of the neural network. These particular rules enable the training of the neural network to be performed efficiently, i.e. the training can be completed faster and requiring fewer computational resources, and effectively, i.e. the trained neural network is stable, reliable and monotonic for providing explainable prediction.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

Operating Environment Example for Machine-Learning Operations

Referring now to the drawings, FIG. 1 is a block diagram depicting an example of an operating environment 100 in which a risk assessment computing system 130 builds and trains a monotonic neural network that can be utilized to predict risk indicators based on predictor variables. FIG. 1 depicts examples of hardware components of a risk assessment computing system 130, according to some aspects. The risk assessment computing system 130 is a specialized computing system that may be used for processing large amounts of data using a large number of computer processing cycles. The risk assessment computing system 130 can include a network training server 110 for building and training a neural network 120 with the monotonic property as presented herein. The risk assessment computing system 130 can further include a risk assessment server 118 for performing risk assessment for given predictor variables 124 using the trained neural network 120.

The network training server 110 can include one or more processing devices that execute program code, such as a network training application 112. The program code is stored on a non-transitory computer-readable medium. The network training application 112 can execute one or more processes to train and optimize a neural network for predicting risk indicators based on predictor variables 124 and maintaining a monotonic relationship between the predictor variables 124 and the predicted risk indicators.

In some embodiments, the network training application 112 can build and train a neural network 120 utilizing neural network training samples 126. The neural network training samples 126 can include multiple training vectors consisting of training predictor variables and training risk indicator outputs corresponding to the training vectors. The neural network training samples 126 can be stored in one or more network-attached storage units on which various repositories, databases, or other structures are stored. Examples of these data structures are the risk data repository 122.

Network-attached storage units may store a variety of different types of data organized in a variety of different ways and from a variety of different sources. For example, the network-attached storage unit may include storage other than primary storage located within the network training server 110 that is directly accessible by processors located therein. In some aspects, the network-attached storage unit may include secondary, tertiary, or auxiliary storage, such as large hard drives, servers, virtual memory, among other types. Storage devices may include portable or non-portable storage devices, optical storage devices, and various other mediums capable of storing and containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as compact disk or digital versatile disk, flash memory, memory or memory devices.

The risk assessment server 118 can include one or more processing devices that execute program code, such as a risk assessment application 114. The program code is stored on a non-transitory computer-readable medium. The risk assessment application 114 can execute one or more processes to utilize the neural network 120 trained by the network training application 112 to predict risk indicators based on input predictor variables 124. In addition, the neural network 120 can also be utilized to generate explanation codes for the predictor variables, which indicate an effect or an amount of impact that a given predictor variable has on the risk indicator.

The output of the trained neural network 120 can be utilized to modify a data structure in the memory or a data storage device. For example, the predicted risk indicator and/or the explanation codes can be utilized to reorganize, flag or otherwise change the predictor variables 124 involved in the prediction by the neural network 120. For instance, predictor variables 124 stored in the risk data repository 122 can be attached with flags indicating their respective amount of impact on the risk indicator. Different flags can be utilized for different predictor variables 124 to indicate different level of impacts. Additionally, or alternatively, the locations of the predictor variables 124 in the storage, such as the risk data repository 122, can be changed so that the predictor variables 124 are ordered, ascendingly or descendingly, according to their respective amounts of impact on the risk indicator.

By modifying the predictor variables 124 in this way, a more coherent data structure can be established which enables the data to be searched more easily. In addition, further analysis on the neural network 120 and the outputs of the neural network 120 can be performed more efficiently. For instance, predictor variables 124 having the most impact on the risk indicator can be retrieved and identified more quickly based on the flags and/or their locations in the risk data repository 122. Further, updating the neural network, such as re-training the neural network based on new values of the predictor variables 124, can be performed more efficiently especially when computing resources are limited. For example, updating or retraining the neural network can be performed by incorporating new values of the predictor variables 124 having the most impact on the output risk indicator based on the attached flags without utilizing new values of all the predictor variables 124.

Furthermore, the risk assessment computing system 130 can communicate with various other computing systems, such as client computing systems 104. For example, client computing systems 104 may send risk assessment queries to the risk assessment server 118 for risk assessment, or may send signals to the risk assessment server 118 that control or otherwise influence different aspects of the risk assessment computing system 130. The client computing systems 104 may also interact with consumer computing systems 106 via one or more public data networks 108 to facilitate electronic transactions between users of the consumer computing systems 106 and interactive computing environments provided by the client computing systems 104.

Each client computing system 104 may include one or more third-party devices, such as individual servers or groups of servers operating in a distributed manner. A client computing system 104 can include any computing device or group of computing devices operated by a seller, lender, or other provider of products or services. The client computing system 104 can include one or more server devices. The one or more server devices can include or can otherwise access one or more non-transitory computer-readable media. The client computing system 104 can also execute instructions that provide an interactive computing environment accessible to consumer computing systems 106. Examples of the interactive computing environment include a mobile application specific to a particular client computing system 104, a web-based application accessible via mobile device, etc. The executable instructions are stored in one or more non-transitory computer-readable media.

The client computing system 104 can further include one or more processing devices that are capable of providing the interactive computing environment to perform operations described herein. The interactive computing environment can include executable instructions stored in one or more non-transitory computer-readable media. The instructions providing the interactive computing environment can configure one or more processing devices to perform operations described herein. In some aspects, the executable instructions for the interactive computing environment can include instructions that provide one or more graphical interfaces. The graphical interfaces are used by a consumer computing system 106 to access various functions of the interactive computing environment. For instance, the interactive computing environment may transmit data to and receive data from a consumer computing system 106 to shift between different states of interactive computing environment, where the different states allow one or more electronics transactions between the mobile device 102 and the host server system 104 to be performed.

A consumer computing system 106 can include any computing device or other communication device operated by a user, such as a consumer or a customer. The consumer computing system 106 can include one or more computing devices, such as laptops, smart phones, and other personal computing devices. A consumer computing system 106 can include executable instructions stored in one or more non-transitory computer-readable media. The consumer computing system 106 can also include one or more processing devices that are capable of executing program code to perform operations described herein. In various examples, the consumer computing system 106 can allow a user to access certain online services from a client computing system 104, to engage in mobile commerce with a client computing system 104, to obtain controlled access to electronic content hosted by the client computing system 104, etc.

For instance, the user can use the consumer computing system 106 to engage in an electronic transaction with a client computing system 104 via an interactive computing environment. An electronic transaction between the consumer computing system 106 and the client computing system 104 can include, for example, the consumer computing system 106 being used to query a set of sensitive or other controlled data, access online financial services provided via the interactive computing environment, submit an online credit card application or other digital application to the client computing system 104 via the interactive computing environment, operating an electronic tool within an interactive computing environment hosted by the client computing system (e.g., a content-modification feature, an application-processing feature, etc.).

In some aspects, an interactive computing environment implemented through a client computing system 104 can be used to provide access to various online functions. As a simplified example, a website or other interactive computing environment provided by a financial institution can include electronic functions for obtaining one or more financial services, such as loan application and management tools, credit card application and transaction management workflows, electronic fund transfers, etc., via. A consumer computing system 106 can be used to request access to the interactive computing environment provided by the client computing system 104, which can selectively grant or deny access to various electronic functions. Based on the request, the client computing system 104 can collect data associated with the customer and communicate with the risk assessment server 118 for risk assessment. Based on the risk indicator predicted by the risk assessment server 118, the client computing system 104 can determine whether to grant the access request of the consumer computing system 106 to certain features of the interactive computing environment.

In a simplified example, the system depicted in FIG. 1 can configure a neural network to be used both for accurately determining risk indicators, such as credit scores, using predictor variables and determining adverse action codes or other explanation codes for the predictor variables. A predictor variable can be any variable predictive of risk that is associated with an entity. Any suitable predictor variable that is authorized for use by an appropriate legal or regulatory framework may be used. Examples of predictor variables include, but are not limited to, variables indicative of one or more demographic characteristics of an entity (e.g., age, gender, income, etc.), variables indicative of prior actions or transactions involving the entity (e.g., information that can be obtained from credit files or records, financial records, consumer records, or other data about the activities or characteristics of the entity), variables indicative of one or more behavioral traits of an entity, etc. The predicted risk indicator can be utilized by a financial institute to determine the risk associated with the entity accessing a financial service provided by the financial institute, thereby granting or denying the access by the entity to an interactive computing environment implementing the financial service.

Each communication within the operating environment 100 may occur over one or more data networks, such as a public data network 108, a network 116 such as a private data network, or some combination thereof. A data network may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or combination of wireless interfaces. A wired network may include a wired interface. The wired or wireless networks may be implemented using routers, access points, bridges, gateways, or the like, to connect devices in the data network.

The numbers of devices depicted in FIG. 1 are provided for illustrative purposes. Different numbers of devices may be used. For example, while certain devices or systems are shown as single devices in FIG. 1, multiple devices may instead be used to implement these devices or systems. Similarly, devices or systems that are shown as separate, such as the network training server 110 and the risk assessment server 118, may be instead implemented in a signal device or system.

Examples of Operations Involving Machine-Learning

Figure 2:
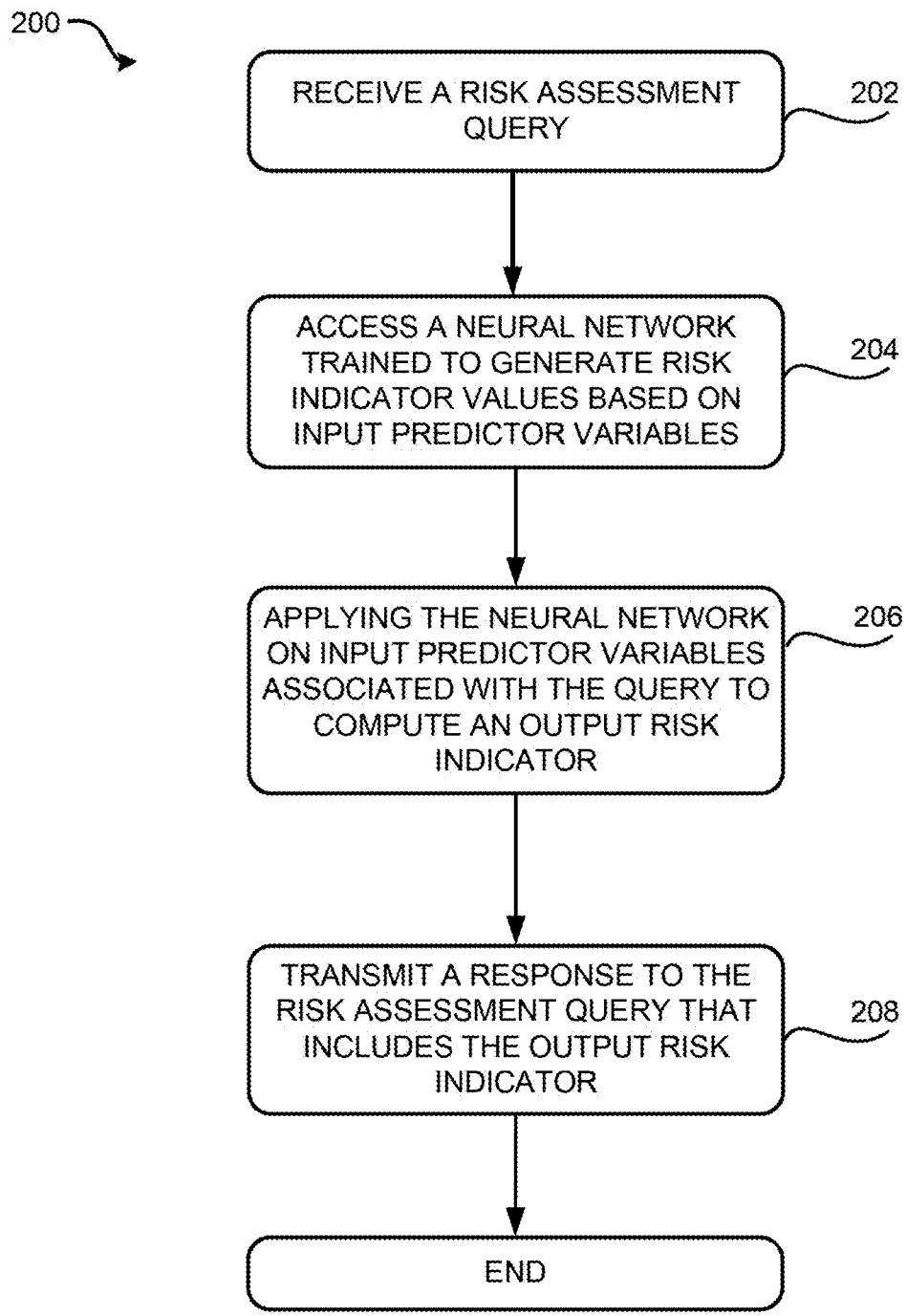
FIG. 2 is a flow chart depicting an example of a process for utilizing a neural network to generate risk indicators for a target entity based on predictor variables associated with the target entity according to certain aspects of the present disclosure.

FIG. 2 is a flow chart depicting an example of a process 200 for utilizing a neural network to generate risk indicators for a target entity based on predictor variables associated with the target entity. At operation 202, the process 200 involves receiving a risk assessment query for a target entity from a remote computing device, such as a computing device associated with the target entity requesting the risk assessment. The risk assessment query can also be received from a remote computing device associated with an entity authorized to request risk assessment of the target entity.

At operation 204, the process 200 involves accessing a neural network trained to generate risk indicator values based on input predictor variables or other data suitable for assessing risks associated with an entity. Examples of predictor variables can include data associated with an entity that describes prior actions or transactions involving the entity (e.g., information that can be obtained from credit files or records, financial records, consumer records, or other data about the activities or characteristics of the entity), behavioral traits of the entity, demographic traits of the entity, or any other traits that may be used to predict risks associated with the entity. In some aspects, predictor variables can be obtained from credit files, financial records, consumer records, etc. The risk indicator can indicate a level of risk associated with the entity, such as a credit score of the entity.

The neural network can be constructed and trained based on training samples including training predictor variables and training risk indicator outputs. Constraints can be imposed on the training of the neural network so that the neural network maintains a monotonic relationship between input predictor variables and the risk indicator outputs. Additional details regarding training the neural network will be presented below with regard to FIGS. 3 and 4.

At operation 206, the process 200 involves applying the neural network to generate a risk indicator for the target entity specified in the risk assessment query. Predictor variables associated with the target entity can be used as inputs to the neural network. The predictor variables associated with the target entity can be obtained from a predictor variable database configured to store predictor variables associated with various entities. The output of the neural network would include the risk indicator for the target entity based on its current predictor variables.

At operation 208, the process 200 involves generating and transmitting a response to the risk assessment query and the response can include the risk indicator generated using the neural network. The risk indicator can be used for one or more operations that involve performing an operation with respect to the target entity based on a predicted risk associated with the target entity. In one example, the risk indicator can be utilized to control access to one or more interactive computing environments by the target entity. As discussed above with regard to FIG. 1, the risk assessment computing system 130 can communicate with client computing systems 104, which may send risk assessment queries to the risk assessment server 118 to request risk assessment. The client computing systems 104 may be associated with banks, credit unions, credit-card companies, insurance companies, or other financial institutions and be implemented to provide interactive computing environments for customers to access various services offered by these institutions. Customers can utilize consumer computing systems 106 to access the interactive computing environments thereby accessing the services provided by the financial institution.

For example, a customer can submit a request to access the interactive computing environment using a consumer computing system 106. Based on the request, the client computing system 104 can generate and submit a risk assessment query for the customer to the risk assessment server 118. The risk assessment query can include, for example, an identity of the customer and other information associated with the customer that can be utilized to generate predictor variables. The risk assessment server 118 can perform risk assessment based on predictor variables generated for the customer and return the predicted risk indicator to the client computing system 104.

Based on the received risk indicator, the client computing system 104 can determine whether to grant the customer access to the interactive computing environment. If the client computing system 104 determines that the level of risk associated with the customer accessing the interactive computing environment and the associated financial service is too high, the client computing system 104 can deny the access by the customer to the interactive computing environment. Conversely, if the client computing system 104 determines that the level of risk associated with the customer is acceptable, the client computing system 104 can grant the access to the interactive computing environment by the customer and the customer would be able to utilize the various financial services provided by the financial institutions. For example, with the granted access, the customer can utilize the consumer computing system 106 to access web pages or other user interfaces provided by the client computing system 104 to query data, submit online digital application, operate electronic tools, or perform various other operations within the interactive computing environment hosted by the client computing system 104.

In other examples, the neural network can also be utilized to generate adverse action codes or other explanation codes for the predictor variables. An adverse action code can indicate an effect or an amount of impact that a given predictor variable has on the value of the credit score or other risk indicator (e.g., the relative negative impact of the predictor variable on a credit score or other risk indicator). In some aspects, the risk assessment application uses the neural network to provide adverse action codes that are compliant with regulations, business policies, or other criteria used to generate risk evaluations. Examples of regulations to which the neural network conforms and other legal requirements include the Equal Credit Opportunity Act ("ECOA"), Regulation B, and reporting requirements associated with ECOA, the Fair Credit Reporting Act ("FCRA"), the Dodd-Frank Act, and the Office of the Comptroller of the Currency ("OCC").

In some implementations, the explanation codes can be generated for a subset of the predictor variables that have the highest impact on the risk indicator. For example, the risk assessment application 114 can determine a rank of each predictor variable based on an impact of the predictor variable on the risk indicator. A subset of the predictor variables including a certain number of highest-ranked predictor variables can be selected and explanation codes can be generated for the selected predictor variables. The risk assessment application 114 may provide recommendations to a target entity based on the generated explanation codes. The recommendations may indicate one or more actions that the target entity can take to improve the risk indicator (e.g., improve a credit score).

Figure 3:
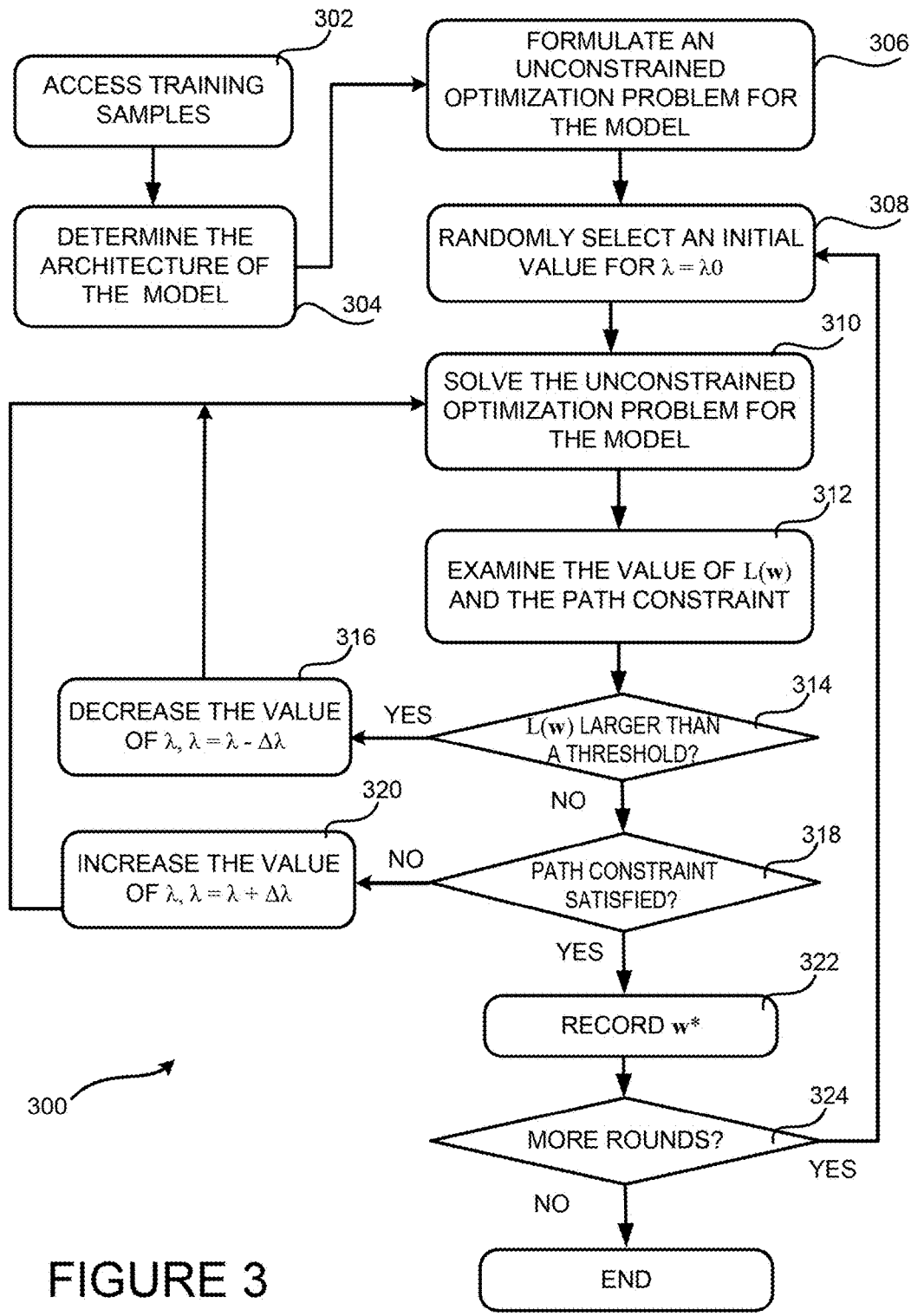
FIG. 3 is a flow chart depicting an example of a process for training a monotonic neural network according to certain aspects of the present disclosure.

Referring now to FIG. 3, a flow chart depicting an example of a process 300 for building and utilizing a monotonic neural network is presented. FIG. 3 will be presented in conjunction with FIG. 4, where a diagram depicting an example of a multi-layer neural network 400 and training samples for the neural network 400 are presented.

Figure 4:
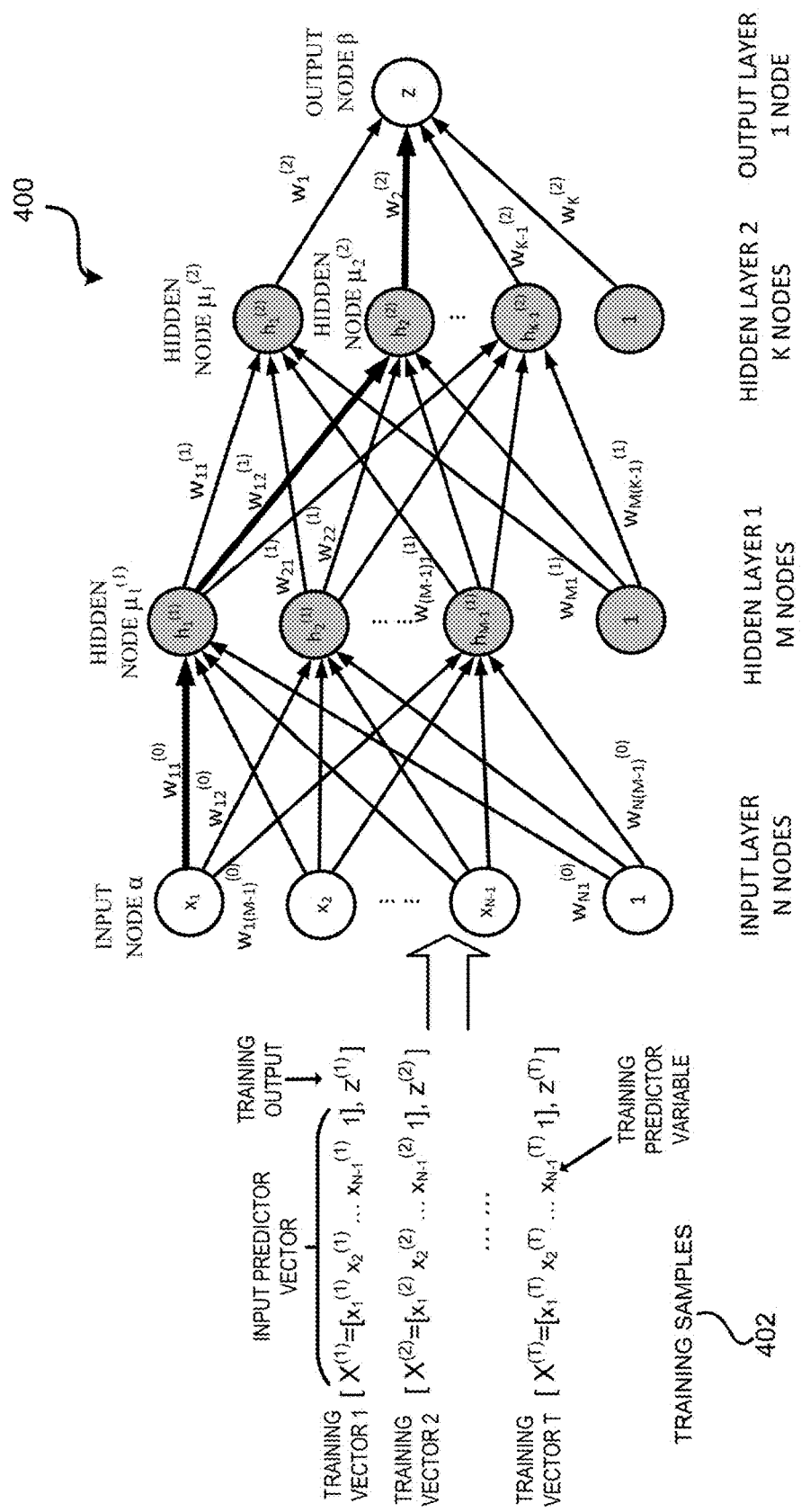
FIG. 4 is a diagram depicting an example of a multi-layer neural network that can be generated and optimized according to certain aspects of the present disclosure.

At operation 302, the process 300 involves obtaining training samples for the neural network model. As illustrated in FIG. 4, the training samples 402 can include multiple training vectors consisting of training predictor variables and training outputs, i.e. training risk indicators. A particular training vector i can include an N-dimensional input predictor vector $X^{(i)}=$ $[x_1^{(i)}, \ldots, x_{N-1}^{(i)}, 1]$ constituting particular values of the training predictor variables, where $i=1, \ldots, T$ and T is the number of training vectors in the training samples. The particular training vector i can also include a training output $z^{(i)}$, i.e. a training risk indicator or outcome corresponding to the input predictor vector $X^{(i)}$.

At operation 304, the process 300 involves determining the architecture of the neural network. Examples of architectural features of the neural network can include the number of layers, the number of nodes in each layer, the activation functions for each node, or some combination thereof. For instance, the dimension of the input variables can be utilized to determine the number of nodes in the input layer. For an input predictor vector having N−1 input variables, the input layer of the neural network can be constructed to have N nodes, corresponding to the N−1 input variables and a constant. Likewise, the number of outputs in a training sample can be utilized to determine the number of nodes in the output layer, that is, one node in the output layer corresponds to one output. Other aspects of the neural network, such as the number of hidden layers, the number of nodes in each hidden layer, and the activation function at each node can be determined based on various factors such as the complexity of the prediction problem, available computation resources, accuracy requirement, and so on.

FIG. 4 illustrates a diagram depicting an example of a multi-layer neural network 400. A neural network model is a memory structure comprising nodes connected via one or more layers. In this example, the neural network 400 includes an input layer having N nodes each corresponding to a training predictor variable in the N-dimension input predictor vector $X=[x_1, \ldots, x_{N-1}, 1]$. The neural network 400 further includes a first hidden layer having M nodes, a second hidden layer having K nodes, and an output layer for a single output z, i.e. the risk indicator or outcome. The weights of the connections from the input layer to the first hidden layer can be denoted as $w_{ij}^{(0)}$, where $i=1, N$ and $j=1, \ldots, M-1$. Similarly, the weights of the connections from the first hidden layer to the second hidden layer can be denoted as $w_{jk}^{(1)}$, where $j=1, \ldots, M$ and $k=1, \ldots, K-1$, and the weights of the connections from the second hidden layer to the output layer can be denoted as $w_k^{(2)}$, where $k=1, \ldots, K$.

The weights of the connections between layers can be utilized to determine the inputs to a current layer based on the output of the previous layer. For example, the input to the $j^{th}$ node in the first hidden layer can be determined as $\Sigma_{i=1}^{N} w_{ij}^{(0)} x_i$, where $x_i$, $i=1, \ldots N$, are the predictor variables in the input predictor vector X, and $j=1, \ldots, M-1$. Similarly, the input to the $k^{th}$ node in the second hidden layer can be determined as $\Sigma_{j=1}^{M} w_{jk}^{(1)} h_j^{(1)}$, where $h_j^{(1)}$, $j=1, \ldots M$, are the outputs of the nodes in the first hidden layer and $k=1, \ldots, K-1$. The input to the output layer of the neural network can be determined as $\Sigma_{k=1}^{K} w_k^{(2)} h_k^{(2)}$, where $h_k^{(2)}$ is the output of the $k^{th}$ node at the second hidden layer.

The output of a hidden layer node or an output layer node can be determined by an activation function implemented at that particular node. In some aspects, output of each of the hidden nodes can be modeled as a logistic function of the input to that hidden node and the output z can be modeled as a logistic function of the outputs of the nodes in the last hidden layer. Specifically, the neural network nodes in the neural network 400 presented in FIG. 4 can employ the following activation functions:

$$h_j^{(1)} = \frac{1}{1+\exp(-Xw^{(0)}j)}, \qquad (1)$$

-continued where $X = [x_1, \ldots, x_{N-1}, 1], w^{(0)j} = [w_{1j}^{(0)}, w_{2j}^{(0)}, w_{Nj}^{(0)}]^T;$ $$h_k^{(2)} = \frac{1}{1 + \exp(-H^{(1)}w^{(1)k})}, \quad (2)$$

where $H^{(1)} = [h_j^{(1)}, \ldots, h_{M-1}^{(1)}, 1], w^{(1)k} = [w_{1k}^{(1)}, w_{2k}^{(1)}, w_{Mk}^{(1)}]^T;$ and $$z = \frac{1}{1 + \exp(-H^{(2)}w^{(2)})}, \quad (3)$$

where $H^{(2)} = [h_j^{(1)}, \ldots, h_{K-1}^{(1)}, 1], w^{(2)} = [w_1^{(2)}, w_2^{(2)}, w_K^{(2)}]^T.$ For illustrative purposes, the neural network 400 illustrated in FIG. 4 and described above includes two hidden layers and a single output. But neural networks with any number of hidden layers and any number of outputs can be formulated in a similar way, and the following analysis can be performed accordingly. Further, in addition to the logistic function presented above, the neural network 400 can have any differentiable sigmoid activation function that accepts real number inputs and outputs a real number. Examples of activation functions include, but are not limited to, the logistic, arc-tangent, and hyperbolic tangent functions. In addition, different layers of the neural network can employ the same or different activation functions.

Referring back to FIG. 3, the process 300 involves formulating an optimization problem for the neural network model at operation 306. Training a neural network can include solving an optimization problem to find the parameters of the neural network, such as the weights of the connections in the neural network. In particular, training the neural network 400 can involve determining the values of the weights w in the neural network 400, i.e. $w^{(0)}$, $w^{(1)}$, and $w^{(2)}$, so that a loss function L(w) of the neural network 400 is minimized. The loss function can be defined as, or as a function of, the difference between the outputs predicted using the neural network with weights w, denoted as $\hat{Z}=[\hat{z}^{(1)} \hat{z}^{(2)} \ldots \hat{z}^{(T)}]$, and the observed output $Z=[z^{(1)} z^{(2)} \ldots z^{(T)}]$. In some aspects, the loss function L(w) can be defined as the negative log-likelihood of the neural network distortion between the predicted value of the output $\hat{Z}$ and the observed output values Z.

However, the neural network trained in this way does not guarantee the monotonic relationship between the input predictor vectors and their corresponding outputs. A monotonic neural network maintains a monotonic relationship between the values of each predictor variable in the training vectors, i.e. $\{x_n^{(1)}, x_n^{(2)}, \ldots, x_n^{(T)}\}$ and the training output $\{z^{(1)}, z^{(2)}, \ldots, z^{(T)}\}$, where n=1, . . . , N−1. A monotonic relationship between a predictor variable $x_n$ and the output z exists if an increase in the value of the predictor variable $x_n$ would always lead to a non-positive (or a non-negative) change in the value of z. In other words, if $x_n^{(i)} > x_n^{(j)}$, then $z^{(i)} \geq z^{(j)}$ for any i and j, or $z^{(i)} \leq z^{(j)}$ for any i and j, where i, j=1, . . . , T.

To assess the relationship between a predictor variable and the output, a path from the input node for the particular predictor variable to the output node can be examined. A path from a first node in the neural network to a second node in the neural network can include a set of nodes and connections between adjacent neural network layers so that the second node can be reached from the first node through that set of nodes and connections. For example, as shown in FIG. 4 in a bolded line, a path from an input node α to the output node β can include the input node α, a hidden node in the first hidden layer $\mu_1^{(1)}$, a hidden node in the second hidden layer $\mu_2^{(2)}$ and the output node β, as well as the connections between these nodes. Another path from the input node α to the output node β can include α, $\mu_1^{(1)}$, another hidden node $\mu_1^{(2)}$ in the second hidden layer, the output node β, as well as the connections between these nodes.

The impact of an input predictor variable $x_i$ on the output z can be determined, at least in part, by the weights along the paths from the input node corresponding to $x_i$ to the output node. These weights include $w_{ij}^{(0)}$, $w_{jk}^{(1)}$ and $w_k^{(2)}$, i=1, . . . , N−1, j=1, . . . , M−1 and k=1, . . . , K−1. In order to maintain the monotonicity between a predictor variable $x_i$ and the output z, a constraint can be imposed on these weights so that the product of weights along any path from the input $x_i$ to the output z, i.e. $w_{ij}^{(0)} w_{jk}^{(1)} w_k^{(2)}$, is greater than or equal to 0. In this way, the impact of the input predictor variable $x_i$ on the output z can be made to be always non-negative. That is, an increase in the input predictor variable $x_i$ would result in a non-negative change (i.e. an increase or no change) in the output z and a decrease in the input predictor variable $x_i$ would lead to a non-positive change (i.e. a decrease or no change) in the output z. Likewise, if a constraint is made on the product of the weights along any path from $x_i$ to z to be non-positive, then the impact of the input predictor variable $x_i$ on z would always be non-positive. That is, an increase in $x_i$ would lead to a non-positive change in z and vice versa. For illustration purposes, the following description involves positive constraints, i.e.

$$w_{ij}^{(0)} w_{jk}^{(1)} w_k^{(2)} \geq 0 \quad (4)$$

i=1, . . . N−1, j=1, . . . , M−1 and k=1, . . . , K−1.

The optimization problem involving negative constraints can be solved similarly.

For a set of values to be greater than or equal to 0, the minimum of the set of values must be greater than or equal to 0. As such, the above constraint in Equation (4) is equivalent to the following path constraint:

$$\min_{i,j,k} w_{ij}^{(0)} w_{jk}^{(1)} w_k^{(2)} \geq 0 \quad (5)$$

With this constraint, the optimization problem of the neural network can be formulated as follows:

$$\min L(w) \quad (6)$$

subject to:

$$\min L(w) \quad (6)$$

subject to: $\min_{i,j,k} w_{ij}^{(0)} w_{jk}^{(1)} w_k^{(2)} \geq 0,$ where min L(w) is the objective function of the optimization problem. w is the weight vector consisting of all the weights in the neural network, i.e. $w_{ij}^{(0)}$, $w_{jk}^{(1)}$, and $w_k^{(2)}$, and L(w) is the loss function of the neural network as defined above.

The constrained optimization problem in Equation (6), however, can be computationally expensive to solve, especially for large scale neural networks, i.e. neural networks involving a large number of the input variables, a large number of the nodes in the neural network, and/or a large number of training samples. In order to reduce the complexity of the optimization problem, a Lagrangian multiplier λ can be introduced to approximate the optimization problem in Equation (6) using a Lagrangian expression by adding a penalty term in the loss function to represent the constraints, and to solve the optimization problem as a sequence of unconstrained optimization problems. In some embodiments, the optimization problem in Equation (6) can be formulated as minimizing a modified loss function of the neural network, $\tilde{L}(w)$:

$$\min \tilde{L}(w) = \min L(w) + \lambda \text{LSE}(w), \qquad (7)$$

where LSE(w) is a LogSumExp ("LSE") function of the weight vector w and it smoothly approximates the path constraint in Equation (5) so that it is differentiable in order to find the optimal value of the objective function $\tilde{L}(w)$. The term LSE(w) can represent either a penalty to the loss function, in case the constraint is not satisfied, or a reward to the loss function, in case the constraint is satisfied. The Lagrangian multiplier λ can adjust the relative importance between enforcing the constraint and minimizing the loss function L(w). A higher value of λ would indicate enforcing the constraints has higher weight and the value of L(w) might not be optimized properly. A lower value of λ would indicate that optimizing the loss function is more important and the constraints might not be satisfied.

In some embodiments, LSE(w) can be formulated as:

$$LSE(w) = \frac{1}{C} \log \sum_{i=1}^{N-1} \sum_{j=1}^{M-1} \sum_{k=1}^{K-1} e^{-Cw_{ij}^{(0)} w_{jk}^{(1)} w_k^{(2)}} \approx -\min_{i,j,k} w_{ij}^{(0)} w_{jk}^{(1)} w_k^{(2)}. \qquad (8)$$

Here, the parameter C is a scaling factor to ensure the approximation of the path constraint in Equation (5) is accurate. For illustrative purposes, an LSE function is presented herein as a smooth differentiable expression of the path constraint. But other functions that can transform the path constraint into a smooth differential expression can be utilized to introduce the path constraint into the objective function of the optimization problem.

By enforcing the training of the neural network to satisfy the specific rules set forth in the monotonic constraint in Equation (4) or Equation (5), a special neural network structure can be established that inherently carries the monotonic property. There is thus no need to perform additional adjustment of the neural network for monotonicity purposes. As a result, the training of the neural network can be completed with fewer operations and thus requires fewer computational resources.

In some aspects, one or more regularization terms can also be introduced into the modified loss function $\tilde{L}(w)$ to regularize the optimization problem. In one example, a regularization term $\|w\|_2^2$, i.e. the L-2 norm of the weight vector w, can be introduced. The regularization term $\|w\|_2^2$ can prevent values of the weights on the paths in the neural network from growing too large so that the neural network can remain stable over time. In addition, introducing the regularization term $\|w\|_2^2$ can prevent overfitting of the neural network, i.e. preventing the neural network from being trained to match the particular set of training samples too closely so that it fails to predict future outputs reliably.

In addition, $\|w\|_1$, i.e. the L-1 norm of the weight vector w, can also be introduced as a regularization term to simplify the structure of the neural network. The regularization term $\|w\|_1$ can be utilized to force weights with small values to be 0, thereby eliminating the corresponding connections in the neural network. By introducing these additional regularization terms, the optimization problem now becomes:

$$\min_w \tilde{L}(w) = \min_w L(w) + \lambda(\alpha_1 LSE(w) + \alpha_2 \|w\|_2^2 + (1 - \alpha_1 - \alpha_2) \|w\|_1) \qquad (9)$$

The parameters $\alpha_1$ and $\alpha_2$ can be utilized to adjust the relative importance of these additional regularization terms with regard to the path constraint. Additional terms can be introduced in the regularization terms to force the neural network model to have various other properties.

Utilizing additional rules, such as the regularization terms in Equation (9), further increase the efficiency and efficacy of the training of the neural network by integrating the various requirements into the training process. For example, by introducing the L-1 norm of the weight vector w into the modified loss function, the structure of the neural network can be simplified by using fewer connections in the neural network. As a result, the training of the neural network becomes faster, requires the consumption of fewer resources, or both. Likewise, rules represented by the L-2 norm of the weight vector w can ensure the trained neural network to be less likely to have an overfitting problem and also be more stable. This eliminates the need for additional adjustment of the trained neural network to address the overfitting and stability issues, thereby reducing the training time and resource consumption of the training process.

To simplify the optimization problem shown in Equation (7) or Equation (9), the Lagrangian multiplier λ can be treated as a hyperparameter. A value of the Lagrangian multiplier λ can be selected and tuned on the training samples in the training of the neural network. By fixing the value of the Lagrangian multiplier λ, the optimization problem of Equation (7) or Equation (9) can be solved using any first or second order unconstrained minimization algorithm to find the optimized weight factor w*.

Referring back to FIG. 3, operations 308 to 324 of the process 300 involve solving the optimization problem by tuning the Lagrangian multiplier λ. At operation 308, an initial value, $\lambda_0$, of the Lagrangian multiplier can be randomly selected. Based on the value of the Lagrangian multiplier $\lambda_0$, the optimization problem in Equation (7) or Equation (9) can be solved at operation 310 to find the optimized weight vector given the current value of λ, denoted as $w^*_{\lambda=\lambda_0}$. For illustration purposes, solving the optimization problem can involve performing iterative adjustments of the weight vectors w of the neural network model. The weight vectors w of the neural network model can be iteratively adjusted so that the value of the modified loss function $\tilde{L}(w)$ in a current iteration is smaller than the value of the modified loss function in an earlier iteration. The iteration of these adjustments can terminate based on one or more conditions no longer being satisfied. For example, the iteration adjustments can stop if the decrease in the values of the modified loss function in two adjacent iterations is no more than a threshold value. Other ways of solving the optimization problem in Equation (7) or Equation (9) can also be utilized.

At operation 312 of the process 300, the path constraint in Equation (4) and the value of the loss function under the current optimized weight vector, i.e. $L(w^*_{\lambda=\lambda_0})$, can be calculated and examined. Operation 314 of the process 300 involves comparing the value of the loss function $L(w^*_{\lambda=\lambda_0})$ with a threshold. If the value of the loss function is higher than the threshold, it means that the path constraint was given too much weight and the loss function was not properly minimized. In that case, the value of λ should be decreased. Operation 316 of the process 300 involves decreasing the value of the current Lagrangian multiplier λ by an adjustment amount Δλ.

Operation 318 of the process 300 involves determining if the path constraint is satisfied by the current optimized weight vector $w^*_{\lambda=\lambda_0}$. If the current optimized weight vector $w^*_{\lambda=\lambda_0}$ violates the path constraint, then the path constraint was not given enough consideration in the training process, and the value of λ should be increased. Operation 320 involves increasing the value of the λ by an adjustment amount Δλ, e.g., $\lambda_1=\lambda_0+\Delta\lambda$.

With the updated value of Lagrangian multiplier λ, operation 310 can be employed again to solve the optimization problem in Equation (7) or Equation (9) to find the optimized weight factor given the current value of λ, i.e. $w^*_{\lambda=\lambda_1}$. If, at operations 314 and 318, it is determined that loss function $L(w^*_\lambda)$ at a current value of λ is smaller than a threshold and that the path constraint is satisfied, the optimized weight vector $w^*_\lambda$ can be recorded and used by the neural network model to perform a prediction based on future input predictor variables.

For illustrative purposes, the examples provided above involve increasing and decreasing λ by the same adjustment amount Δλ. But the amount of changes can be different for the increasing and the decreasing operations. Further, the value of Δλ can be different for different iterations and be determined dynamically based on factors such as the value of the loss function L(w).

Because the modified loss function $\tilde{L}(w)$ can be a non-concave function, the randomly selected initial value of the Lagrangian multiplier, $\lambda_0$, could, in some cases, cause the solution to the optimization problem in Equation (7) or Equation (9) to be a local optimum instead of a global optimum. Some aspects can address this issue by randomly selecting initial weight vectors for w and/or repeating the above process with different random initial values of the Lagrangian multiplier λ. For example, process 300 can include an operation 324 to determine if additional rounds of the above process are to be performed. If so, operation 308 to operation 322 can be employed to train the model and tune the value of the Lagrangian multiplier λ based on a different initial value $\lambda_0$. In these aspects, an optimized weight vector can be selected from the results of the multiple rounds of optimization, for example, by selecting a w* resulting in the smallest value of the loss function L(w) and satisfying the path constraint. By selecting the optimized weight factor w*, the neural network can be utilized to predict an output risk indicator based on input predictor variables as explained above with regard to FIG. 2.

Examples of Computing Explanation Codes with Neural Network

In some aspects, the use of optimized neural networks can provide improved performance over solutions for generating, for example, credit scores that involve modeling predictor variables monotonically using a logistic regression model. For example, in these models, these solutions may assign explanation codes using a logistic regression model to obtain a probability p=P(Y=1) of a binary random variable Y. An example of a logistic regression model is given by the following equation:

$$\log\left(\frac{p}{1-p}\right) = f(V_1, \ldots, V_n) = V\beta = \beta_0 + V_1\beta_1 + \ldots + V_n\beta_n, \quad (10)$$

such that $$p = \frac{1}{1+\exp(-V\beta)}. \quad (11)$$

The points lost per predictor variable may then be calculated as follows. Let $v_i^m$ be the value of the predictor variable $V_i$ that maximizes $f(V_1, \ldots, v_i^m, \ldots, V_n)$. For an arbitrary function $f$, $v_i^m$ may depend on other predictor variables. However, because of the additive nature of the logistic regression model, $v_i^m$ and the points lost for the predictor variable $V_i$ do not depend upon the other predictor variables since $$\begin{aligned}f(V_1, \ldots, v_i^m, \ldots, V_n) - f(V_1, \ldots, V_i, \ldots, V_n) = (\beta_0 + \\ v_1^m\beta_1 + \ldots + \beta_i v_i^m + \ldots + \beta_n v_n^m) - \\ (\beta_0 + v_1^m\beta_1 + \ldots + \beta_i V_i + \ldots + \beta_n v_n^m) = \beta_i(v_i^m - V_i).\end{aligned} \quad (12)$$

Since the logit transformation log $$\left(\frac{p}{1-p}\right)$$

is monotonically increasing in p, the same value $v_i^m$ maximizes p. Therefore, rank-ordering points lost per predictor variable is equivalent to rank-ordering the score loss. Hence, the rank-ordering of the explanation codes is equivalent using the log-odds scale or the probability score scale. Moreover, $f$ is either always increasing in $V_i$ if $\beta_i>0$, or always decreasing in $V_i$ if $\beta_i<0$, since $$\frac{\partial}{\partial X_i}(f) = \beta_i.$$

Therefore $v_i^m$ is determined from the appropriate endpoint of the domain of $V_i$ and does not depend upon the other predictor variables.

The Equation (12) above may be used in contexts other than logistic regression, although the subsequent simplifications in Equation (12) may no longer be applicable. For example, the automated modeling application can use the Equation (12) above for any machine learning technique generating a score as $f(V_1, \ldots, V_n)$.

For neural networks, the computational complexity of Equation (12) may result from determining $v_i^m$ in a closed form solution as a function of other input predictor variables. Contrary to logistic regression, solving for $v_i^m$ requires numerical approximation and can be dependent upon the other predictor variables. The storage and computing requirements to generate tables of numerical approximations for $v_i^m$ for all combinations of the other predictor variables can be impractical or infeasible for a processing device.

In some aspects, the neural network built and trained herein has the monotonicity property. The value $v_i^m$ of $V_i$ that maximizes an output expected value score can be explicitly determined by one endpoint of the predictor variable $V_i$'s domain. As a result, for each target entity, Equation (12) can be leveraged to rank-order a number of points lost for each predictor variable. Explanation codes can be associated with each predictor variable and the ranking can correctly assign the key reason codes to each target entity.

The above described training process can thus reduce the amount of computational complexity such that the same neural network model can be used by a computer-implemented algorithm to determine a credit score and the explanation codes that are associated with the credit score. In prior solutions, the computational complexity involved in generating a neural network model that can be used for both determining credit scores and explanation codes may be too high to use a computer-implemented algorithm using such a neural network model. Thus, in prior solutions, it may be computationally inefficient or computationally infeasible to use the same neural network to identify explanation codes and generate a credit score. For example, a data set used to generate credit scores may involve financial records associated with millions of consumers. Numerically approximating the location of each consumer's global maximum score is computationally intractable using current technology in a run-time environment.

Example of Computing System for Machine-Learning Operations

Figure 5:
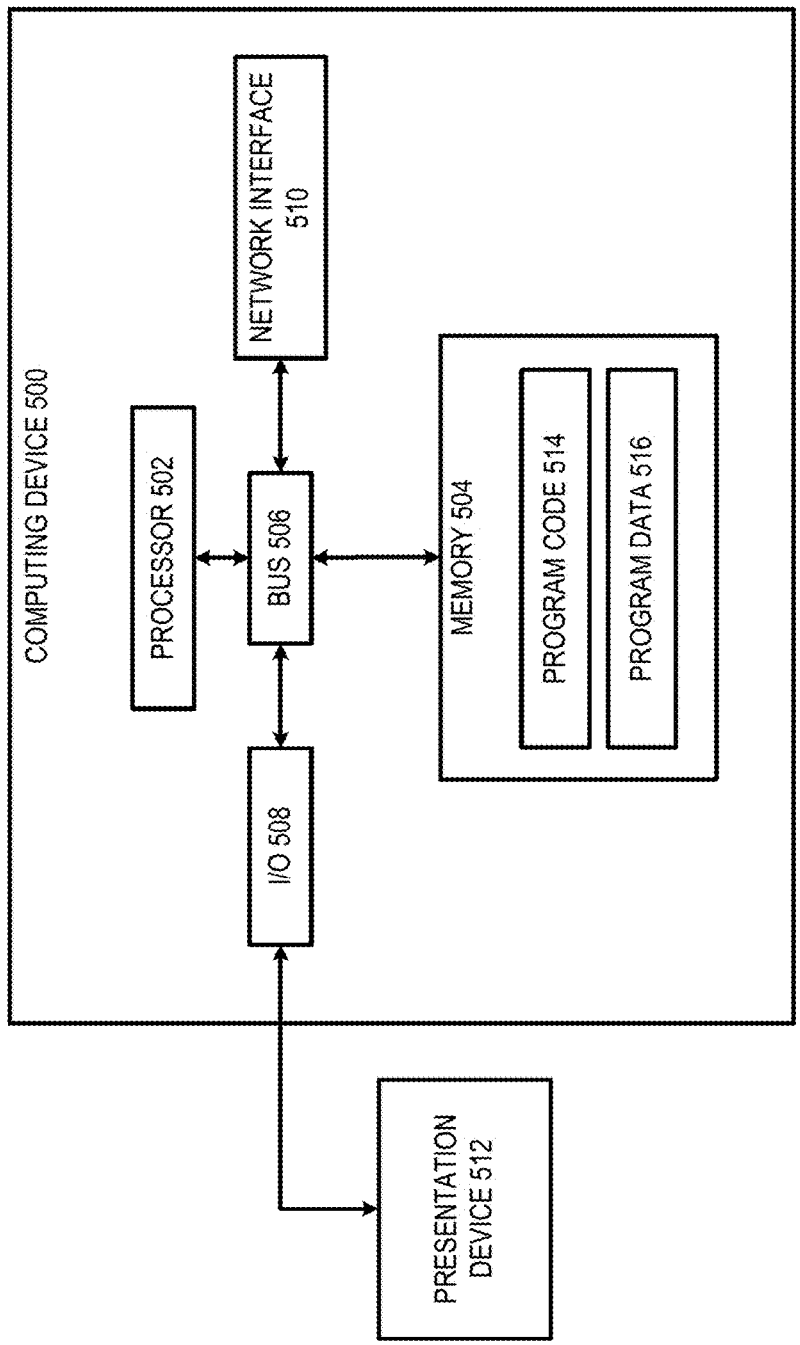
FIG. 5 is a block diagram depicting an example of a computing system suitable for implementing aspects of the techniques and technologies presented herein.

Any suitable computing system or group of computing systems can be used to perform the operations for the machine-learning operations described herein. For example, FIG. 5 is a block diagram depicting an example of a computing device 500, which can be used to implement the risk assessment server 118 or the network training server 110. The computing device 500 can include various devices for communicating with other devices in the operating environment 100, as described with respect to FIG. 1. The computing device 500 can include various devices for performing one or more transformation operations described above with respect to FIGS. 1-4.

The computing device 500 can include a processor 502 that is communicatively coupled to a memory 504. The processor 502 executes computer-executable program code stored in the memory 504, accesses information stored in the memory 504, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others.

Examples of a processor 502 include a microprocessor, an application-specific integrated circuit, a field-programmable gate array, or any other suitable processing device. The processor 502 can include any number of processing devices, including one. The processor 502 can include or communicate with a memory 504. The memory 504 stores program code that, when executed by the processor 502, causes the processor to perform the operations described in this disclosure.

The memory 504 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, ROM, RAM, an ASIC, magnetic storage, or any other medium from which a computer processor can read and execute program code. The program code may include processor-specific program code generated by a compiler or an interpreter from code written in any suitable computer-programming language. Examples of suitable programming language include Hadoop, C, C++, C#, Visual Basic, Java, Python, Perl, JavaScript, ActionScript, etc.

The computing device 500 may also include a number of external or internal devices such as input or output devices. For example, the computing device 500 is shown with an input/output interface 508 that can receive input from input devices or provide output to output devices. A bus 506 can also be included in the computing device 500. The bus 506 can communicatively couple one or more components of the computing device 500.

The computing device 500 can execute program code 514 that includes the risk assessment application 114 and/or the network training application 112. The program code 514 for the risk assessment application 114 and/or the network training application 112 may be resident in any suitable computer-readable medium and may be executed on any suitable processing device. For example, as depicted in FIG. 5, the program code 514 for the risk assessment application 114 and/or the network training application 112 can reside in the memory 504 at the computing device 500 along with the program data 516 associated with the program code 514, such as the predictor variables 124 and/or the neural network training samples 126. Executing the risk assessment application 114 or the network training application 112 can configure the processor 502 to perform the operations described herein.

In some aspects, the computing device 500 can include one or more output devices. One example of an output device is the network interface device 510 depicted in FIG. 5. A network interface device 510 can include any device or group of devices suitable for establishing a wired or wireless data connection to one or more data networks described herein. Non-limiting examples of the network interface device 510 include an Ethernet network adapter, a modem, etc.

Another example of an output device is the presentation device 512 depicted in FIG. 5. A presentation device 512 can include any device or group of devices suitable for providing visual, auditory, or other suitable sensory output. Non-limiting examples of the presentation device 512 include a touchscreen, a monitor, a speaker, a separate mobile computing device, etc. In some aspects, the presentation device 512 can include a remote client-computing device that communicates with the computing device 500 using one or more data networks described herein. In other aspects, the presentation device 512 can be omitted.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification that terms such as "processing," "computing," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or di splay devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computing systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

The invention claimed is:

1. A method that includes one or more processing devices performing operations comprising:
    training a neural network model for computing a risk indicator from predictor variables, wherein the neural network model is a memory structure comprising nodes connected via one or more layers, wherein training the neural network model to generate a trained neural network model comprises:
        accessing training vectors having elements representing training predictor variables and training outputs, wherein a particular training vector comprises (i) particular values for the predictor variables, respectively, and (ii) a particular training output corresponding to the particular values, and
        performing iterative adjustments of parameters of the neural network model to minimize a loss function of the neural network model subject to a path constraint, the path constraint requiring a monotonic relationship between (i) values of each predictor variable from the training vectors and (ii) the training outputs of the training vectors, wherein one or more of the iterative adjustments comprises adjusting the parameters of the neural network model so that a value of a modified loss function in a current iteration is smaller than the value of the modified loss function in another iteration, and wherein the modified loss function comprises the loss function of the neural network model and the path constraint;
    receiving, from a remote computing device, a risk assessment query for a target entity;
    computing, responsive to the risk assessment query, an output risk indicator for the target entity by applying the trained neural network model to predictor variables associated with the target entity; and
    transmitting, to the remote computing device, a responsive message including the output risk indicator, wherein the output risk indicator is usable for controlling access to one or more interactive computing environments by the target entity.

2. The method of claim 1, wherein the neural network model comprises at least an input layer, one or more hidden layers, and an output layer, and wherein the parameters for the neural network model comprise weights of connections among the input layer, the one or more hidden layers, and the output layer.

3. The method of claim 2, wherein the path constraint comprises, for each path comprising a respective set of nodes across the layers of the neural network model from the input layer to the output layer, a positive product of the respective weights applied to the respective set of nodes in the path.

4. The method of claim 1, wherein the path constraint is approximated by a smooth differentiable expression in the modified loss function.

5. The method of claim 4, wherein the smooth differentiable expression is introduced into the modified loss function through a hyperparameter, and wherein training the neural network model further comprises:
    setting the hyperparameter to a random initial value prior to performing the iterative adjustments; and
    in one or more of the iterative adjustments, determining a particular set of parameter values for the parameters of the neural network model based on the random initial value of the hyperparameter.

6. The method of claim 5, wherein training the neural network model further comprises:
    determining a value of the loss function of the neural network model based on the particular set of parameter values associated with the random initial value of the hyperparameter;
    determining that the value of the loss function is greater than a threshold loss function value;
    updating the hyperparameter by decrementing the value of the hyperparameter; and
    determining an additional set of parameter values for the neural network model based on the updated hyperparameter.

7. The method of claim 5, wherein training the neural network model further comprises:
    determining that the path constraint is violated by the particular set of parameter values for the neural network model;
    updating the hyperparameter by incrementing the value of the hyperparameter; and determining an additional set of parameter values for the neural network model based on the updated hyperparameter.

8. The method of claim 5, wherein the hyperparameter is a Lagrangian multiplier.

9. A system comprising:
a processing device; and
a memory device in which instructions executable by the processing device are stored for causing the processing device to:
train a neural network model for computing a risk indicator from predictor variables, wherein the neural network model is a memory structure comprising nodes connected via one or more layers, wherein training the neural network model to generate a trained neural network model comprises:
access training vectors having elements representing training predictor variables and training outputs, wherein a particular training vector comprises (i) particular values for the predictor variables, respectively, and (ii) a particular training output corresponding to the particular values, and
perform iterative adjustments of parameters of the neural network model to minimize a loss function of the neural network model subject to a path constraint, the path constraint requiring a monotonic relationship between (i) values of each predictor variable from the training vectors and (ii) the training outputs of the training vectors, wherein one or more of the iterative adjustments comprises adjusting the parameters of the neural network model so that a value of a modified loss function in a current iteration is smaller than the value of the modified loss function in another iteration, and wherein the modified loss function comprises the loss function of the neural network model and the path constraint;
compute, responsive to a risk assessment query for a target entity received from a remote computing device, an output risk indicator for the target entity by applying the trained neural network model to predictor variables associated with the target entity; and
transmit, to the remote computing device, a responsive message including the output risk indicator, wherein the output risk indicator is usable for controlling access to one or more interactive computing environments by the target entity.

10. The system of claim 9, wherein the neural network model comprises at least an input layer, one or more hidden layers, and an output layer, and wherein the parameters for the neural network model comprise weights of connections among the input layer, the one or more hidden layers, and the output layer.

11. The system of claim 10, wherein the path constraint comprises, for each path comprising a respective set of nodes across the layers of the neural network model from the input layer to the output layer, a positive product of the respective weights applied to the respective set of nodes in the path.

12. The system of claim 9, wherein the path constraint is approximated by a smooth differentiable expression in the modified loss function, and wherein the smooth differentiable expression is introduced into the modified loss function through a hyperparameter.

13. The system of claim 12, wherein training the neural network model further comprises, adding one or more regularization terms into the modified loss function through the hyperparameter, wherein the one or more regularization terms represent quantitative measurements of the parameters of the neural network model, wherein the one or more of the iterative adjustments comprises adjusting the parameters of the neural network model so that a value of the modified loss function with the regularization terms in a current iteration is smaller than the value of the modified loss function with the regularization terms in another iteration.

14. The system of claim 13, wherein the one or more regularization terms comprise one or more of:
a function of an L−2 norm of a weight vector comprising the weights of the neural network model, and
a function of an L−1 norm of the weight vector.

15. A non-transitory computer-readable storage medium having program code that is executable by a processor device to cause a computing device to perform operations, the operations comprising:
training a neural network model for computing a risk indicator from predictor variables, wherein the neural network model is a memory structure comprising nodes connected via one or more layers, wherein training the neural network model to generate a trained neural network comprises:
accessing training vectors having elements representing training predictor variables and training outputs, wherein a particular training vector comprises (i) particular values for the predictor variables, respectively, and (ii) a particular training output corresponding to the particular values, and
performing iterative adjustments of parameters of the neural network model to minimize a loss function of the neural network model subject to a path constraint, the path constraint requiring a monotonic relationship between (i) values of each predictor variable from the training vectors and (ii) the training outputs of the training vectors, wherein one or more of the iterative adjustments comprises adjusting the parameters of the neural network model so that a value of a modified loss function in a current iteration is smaller than the value of the modified loss function in another iteration, and wherein the modified loss function comprises the loss function of the neural network model and the path constraint;
computing, responsive to a risk assessment query for a target entity received from a remote computing device, an output risk indicator for the target entity by applying the trained neural network model to predictor variables associated with the target entity; and
transmitting, to the remote computing device, a responsive message including the output risk indicator, wherein the output risk indicator is usable for controlling access to one or more interactive computing environments by the target entity.

16. The non-transitory computer-readable storage medium of claim 15, wherein the path constraint is approximated by a smooth differentiable expression in the modified loss function.

17. The non-transitory computer-readable storage medium of claim 16, wherein the smooth differentiable expression is introduced into the modified loss function through a hyperparameter, and wherein training the neural network model further comprises:
setting the hyperparameter to a random initial value prior to performing the iterative adjustments; and
in one or more of the iterative adjustments, determining a particular set of parameter values for the parameters of the neural network model based on the random initial value of the hyperparameter.

18. The non-transitory computer-readable storage medium of claim 17, wherein training the neural network model further comprises, adding one or more regularization terms into the modified loss function through the hyperparameter, wherein the one or more regularization terms represent quantitative measurements of the parameters of the neural network model, wherein the one or more of the iterative adjustments comprises adjusting the parameters of the neural network model so that a value of the modified loss function with the regularization terms in a current iteration is smaller than the value of the modified loss function with the regularization terms in another iteration.

19. The non-transitory computer-readable storage medium of claim 15,
   wherein the neural network model comprises at least an input layer, one or more hidden layers, and an output layer,
   wherein the parameters for the neural network model comprise weights of connections among the input layer, the one or more hidden layers, and the output layer, and
   wherein the path constraint comprises, for each path comprising a respective set of nodes across the layers of the neural network model from the input layer to the output layer, a positive product of the respective weights applied to the respective set of nodes in the path.

\* \* \* \* \*